United States Patent
Graniello et al.

(10) Patent No.: US 12,455,841 B2
(45) Date of Patent: *Oct. 28, 2025

(54) ADAPTIVE FABRIC ALLOCATION FOR LOCAL AND REMOTE EMERGING MEMORIES BASED PREDICTION SCHEMES

(71) Applicant: Intel Corporation, Santa Clara, CA (US)

(72) Inventors: Benjamin Graniello, Gilbert, AZ (US); Francesc Guim Bernat, Barcelona (ES); Karthik Kumar, Chandler, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,513

(22) Filed: Sep. 22, 2023

(65) Prior Publication Data
US 2024/0086341 A1 Mar. 14, 2024

Related U.S. Application Data

(63) Continuation of application No. 16/721,706, filed on Dec. 19, 2019, now Pat. No. 11,789,878.

(51) Int. Cl.
*G06F 3/06* (2006.01)
*G06F 9/50* (2006.01)
(Continued)

(52) U.S. Cl.
CPC .......... *G06F 13/1663* (2013.01); *G06F 3/061* (2013.01); *G06F 3/0635* (2013.01);
(Continued)

(58) Field of Classification Search
CPC ........ G06F 3/061; G06F 3/0635; G06F 3/067; G06F 3/0685; G06F 9/5016; G06F 11/3037
See application file for complete search history.

(56) References Cited

U.S. PATENT DOCUMENTS

2006/0140119 A1 6/2006 Yeh et al.
2014/0201500 A1 7/2014 Niell et al.
(Continued)

OTHER PUBLICATIONS

Wikipedia, "PCI Express," Dec. 17, 2016, available: https://web.archive.org/web/20191217201949/https://en.wikipedia.org/wiki/Main_Page.*

(Continued)

*Primary Examiner* — Tracy A Warren
(74) *Attorney, Agent, or Firm* — Compass IP Law PC

(57) ABSTRACT

Methods, apparatus and systems for adaptive fabric allocation for local and remote emerging memories-based prediction schemes. In conjunction with performing memory transfers between a compute host and memory device connected via one or more interconnect segments, memory read and write traffic is monitored for at least one interconnect segment having reconfigurable upstream lanes and downstream lanes. Predictions of expected read and write bandwidths for the at least one interconnect segment are then made. Based on the expected read and write bandwidths, the upstream lanes and downstream lanes are dynamically reconfigured. The interconnect segments include interconnect links such as Compute Exchange Link (CXL) flex buses and memory channels for local memory implementations, and fabric links for remote memory implementations. For local memory, management messages may be used to provide telemetry information containing the expected read and write bandwidths. For remote memory, telemetry informa- (Continued)

tion is provided to a fabric management component that is used to dynamically reconfigure one or more fabric links.

20 Claims, 17 Drawing Sheets

(51) Int. Cl.
  *G06F 11/30*  (2006.01)
  *G06F 12/02*  (2006.01)
  *G06F 13/16*  (2006.01)
  *G06F 15/78*  (2006.01)

(52) U.S. Cl.
  CPC ............ *G06F 3/067* (2013.01); *G06F 3/0685* (2013.01); *G06F 9/5016* (2013.01); *G06F 11/3037* (2013.01); *G06F 12/0246* (2013.01); *G06F 13/1678* (2013.01); *G06F 15/7807* (2013.01)

(56) References Cited

U.S. PATENT DOCUMENTS

| | | |
|---|---|---|
| 2017/0147056 A1 | 5/2017 | Woo et al. |
| 2018/0059977 A1 | 3/2018 | Matsuyama et al. |
| 2018/0287882 A1 | 10/2018 | Xu et al. |
| 2018/0307295 A1 | 10/2018 | Tameem et al. |
| 2018/0351812 A1 | 12/2018 | Borch et al. |
| 2019/0042524 A1 | 2/2019 | Sharma |
| 2019/0065261 A1 | 2/2019 | Narayan et al. |
| 2019/0101974 A1 | 4/2019 | Bernat |
| 2019/0250930 A1 | 8/2019 | Erez |
| 2019/0384733 A1 | 12/2019 | Jen et al. |
| 2020/0104264 A1* | 4/2020 | Khandual ........... G06F 16/9024 |
| 2020/0242000 A1 | 7/2020 | Khosrowpour et al. |
| 2021/0182220 A1 | 6/2021 | Yudanov |

OTHER PUBLICATIONS

European Office Action, (EP Exam Report Article 94(3) EPC), for Patent Application No. 20193520.2, Mailed May 4, 2022, 4 pages.
Extended European Search Report for Patent Application No. 20193520.2, Mailed Feb. 3, 2021, 7 pages.
First Office Action for U.S. Appl. No. 16/721,706, Mailed Feb. 9, 2023, 29 pages.
Knowlton, S., "Introduction to Compute Express Link (CXL): The CPU-To-Device Interconnect Breakthrough," Sep. 23, 2019, available: https://www.computeexpresslink.org/post/ introduction-to-compute-express-link-cxl-the-cpu-to-device-interconnect-breakthrough.
Notice of Allowance for U.S. Appl. No. 16/721,706, Mailed Jun. 13, 2023, 16 pages.
Ruggles, G., "Introduction to the Compute Express Link Standard," DesignWare Technical Bulletin, Nov. 30, 2019, available: https://web.archive.org/web/20191130015826/https://www.synopsys.com/designware-ip/technical-bul letin/compute-express-li nk-standard-2019q3.html.

* cited by examiner

ADAPTIVE FABRIC ALLOCATION FOR LOCAL AND REMOTE EMERGING MEMORIES BASED PREDICTION SCHEMES

CLAIM OF PRIORITY

This application is a continuation of previously filed U.S. patent application Ser. No. 16/721,706, filed Dec. 19, 2019. The entire contents of which is incorporated herein by reference in its entirety.

BACKGROUND INFORMATION

Computational performance in computer systems is a primarily based on the performance of the processor or CPU (Central Processing Unit) and the effective access bandwidth of the memory/cache hierarchy in the system. Historically, processor performance scaled with processor frequency for a given processor architecture (e.g., 16-bit, 32-bit, 64-bit), generally following Moore's law. Aspects of the effective access bandwidth of the memory/cache hierarchy also scaled with frequency of the memory devices (e.g., various generations of Dual In-line Memory Modules or DIMMs) and the bandwidth of the interconnect connecting the memory devices to the processor (a function of interconnect width and frequency). In parallel, the effective access bandwidth was further scaled by increasing the size and speed of the caches at each level in the cache hierarchy.

In recent years, processor frequencies have hit a wall of about 5 GHz, with most processors running at 4 GHz or less. To continue to scale performance, processor architectures have added more cores, which, in turn, increases the memory cache/hierarchy complexity and puts greater pressure on the memory interconnect bandwidth. The net result is the memory interconnect bandwidth becomes a performance bottleneck. As with processor frequencies, the memory interconnect and memory device frequencies have also hit a wall.

Also, in recent years the memory interconnect structure has changed for some system architectures, such as those used in data centers. For instance, historically a processor has been connected to one or more memory devices via a bus or the like, such as a front-side bus, with most data relating to memory accesses being transferred over the bus. Such busses operate at a fixed frequency that generally is a substantial fraction of the processor's internal frequency (e.g., 40-50%). However, under current and future data center environments a significant amount of data transfers may be between a processor and off-chip accelerators or the like over interconnects such as Peripheral Component Interconnect Express (PCIe) today and Compute Express Link (CXL) in the near future. Moreover, under disaggregated architectures a processor/SoC and memory device or accelerator may be installed in separate chassis, trays, or sleds that are interconnected via a high-speed fabric.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
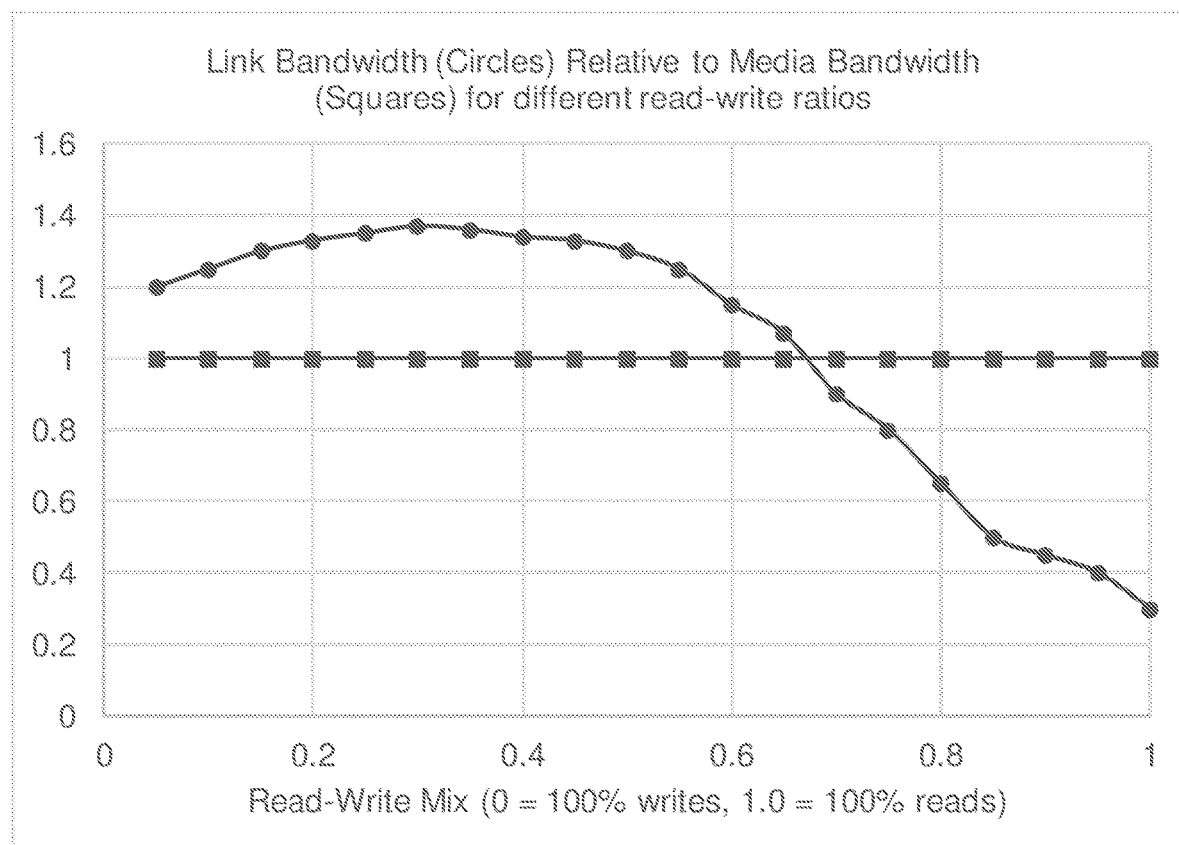
FIG. 1 is a graph showing variance in link bandwidth relative to media bandwidth.

Embodiments of methods, apparatus and systems for adaptive fabric allocation for local and remote emerging memories-based prediction schemes are described herein. In the following description, numerous specific details are set forth (such as PCIe and CXL) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Emerging memory technologies, such as DC Persistent Memory Module (DCPMM) offer several compelling advantages over conventional volatile DRAM DIMMs, including large capacities, persistence, etc. However, a common challenge for emerging memory technologies has been the power budget. First, bandwidth is heavily a function of power, thus higher bandwidth requires more power. Second, write bandwidth is much lower than read bandwidth. As DCPMMs and similar memory technologies become increasingly mainstream in adoption, there emerges a need to improve the available bandwidth (by increasing the power budget per DCPMM or DIMM) and also to avoid contention with DRAM in the channel. One consensus to address the above needs is to use a drive form factor for the DIMM, connected as local memory via socket-to-DIMM interconnect, such as Computer Express Link (CXL), and/or connected via fabric interconnects and implemented as remote memory. (Note the term "DIMM" is used herein generically to refer to conventional DIMMS and drive form-factor DIMMs for simplicity and convenience—it will be understood that drive form-factor DIMMs have different form-factors than conventional DIMMs. Other form factors may also be used, such as RAID, for example.)

Usage of these new interconnects to connect to the DIMM introduces some unique technical challenges. First, the interconnects have less bandwidth than the built-in DIMM interface (but still sufficient, making it important to use the interconnect resources efficiently). Second, the interconnects have lanes for transmit and receive functionalities that corresponds to reads and writes to memory.

Consider a configuration where there is a 1:1 lane assignment for transmit/receive (full duplex). Further consider the case when there is only write traffic to the DIMM. In this case, the transmission bandwidth (rate of data transferred) in GB/s is significantly lower than the case when there is only read traffic to the DIMM.

This is graphically illustrated in FIG. 1, which compares link bandwidth relative to media (persistent memory material) bandwidth for a future platform scenario. Under the left-most extreme (100% writes, the interconnect is not a bottleneck in a full duplex lane configuration. Conversely, in the right-most extreme (100% reads) there is a significant bottleneck due to the interconnect under over 60% of the media bandwidth cannot be used. An additional variable in this problem is the fact that the traffic itself can be random or sequential, in addition to being a certain read-write mix, and as FIG. 1 shows, this also determines the pressure on the band-end media bandwidth.

Under embodiments disclosed herein, a hardware-based telemetry and feedback mechanism with hooks is provided to allow dynamic lane configuration based on memory traffic characteristics, to maximize bandwidth, for both fabric and local interconnects, such as but not limited to CXL interconnects (referred to as CXL flex buses or alternatively CXL links). Under one aspect of the architecture, monitoring and prediction logic is included within the memory DIMM that is responsible to monitor and predict future memory read and write requested bandwidth based on historical data from (1) traffic coming to the DIMM; and (2) current behavior of the non-volatile memory cache architecture. In some embodiments, the prediction algorithm is based on existing IP (intellectual property) such as finger-printing).

Figure 2:
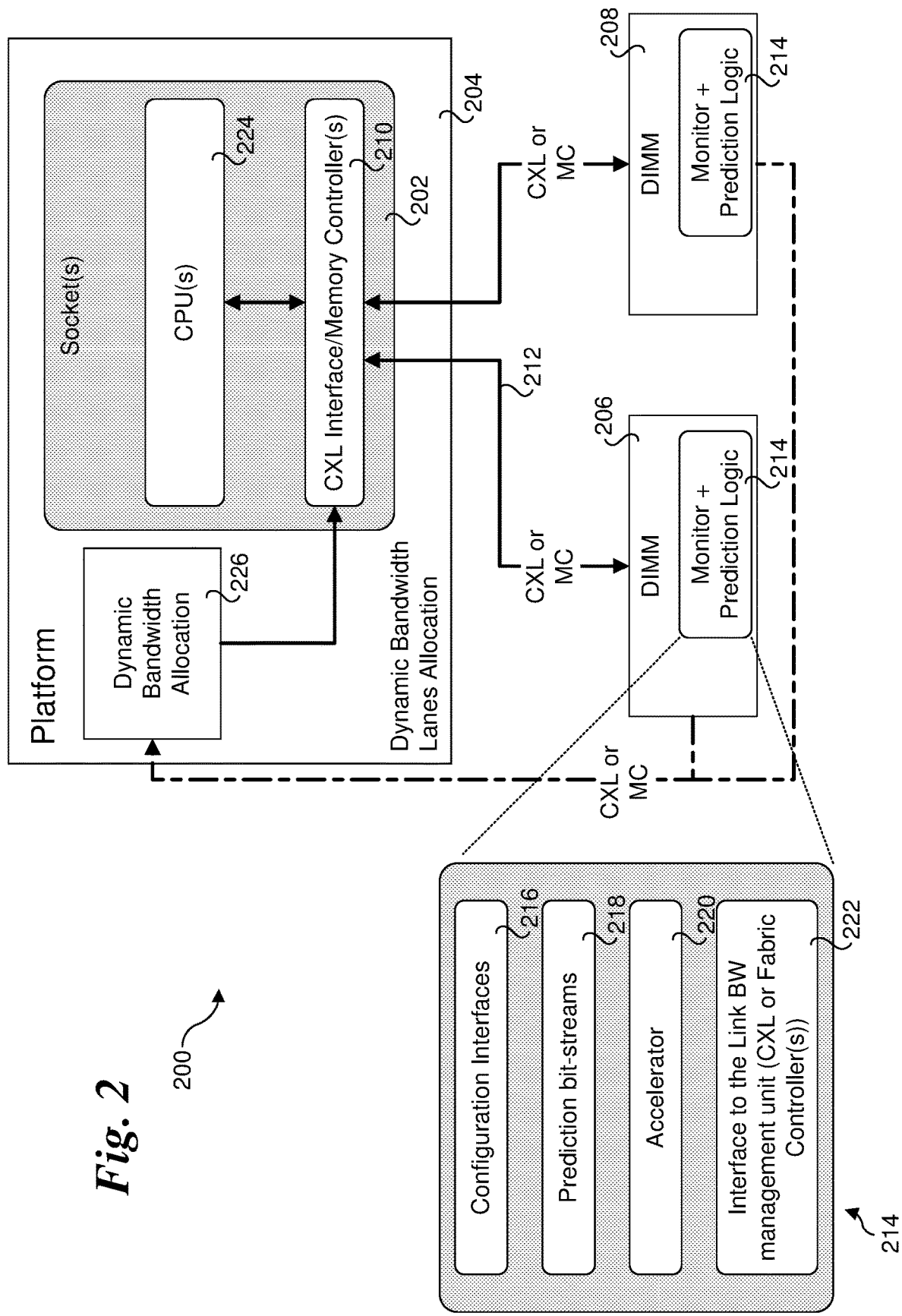
FIG. 2 is a schematic diagram illustrating an architecture supporting dynamic lane configuration using hardware-based telemetry and feedback for a local memory implementation using a CXL flex bus or memory channel, according to one embodiment.

FIG. 2 shows an architecture 200 supporting dynamic lane configuration using hardware-based telemetry and feedback for a local memory implementation. Under architecture 200 each of one or more sockets 202 of a platform 204 is connected to a pair of DIMMs 206 and 208 via a CXL interface/memory controller 210 and one or more CXL flex buses 212 or reconfigurable memory channel (MC) 212. Each of DIMMs 206 and 208 include monitor+prediction logic 214, which comprises configuration interfaces 216, prediction bit-streams 218, an accelerator 220, and an interface to a link bandwidth (BW) management unit 222. Each socket 202 also includes one or more CPUs 224 connected to CXL interface/memory controller 210.

As illustrated in architecture 200, monitor+prediction logic 214 provides feedback to a dynamic bandwidth allocation block 226. Under architecture 200 the feedback is provided via a logic channel implemented over the physical CXL flex bus 212 connected to DIMMs 206 and 208 when DIMMs 206 and 208 are connected via a CXL flex bus or over MC 212 when DIMMs 206 and 208 are connect via a reconfigurable memory channel. For example, in one embodiment the feedback information is communicated over a CXL flex bus using CXL management messages and received by dynamic bandwidth allocation block 226, while in another embodiment feedback information is communicated over a memory channel using memory channel management messages.

Figure 2A:
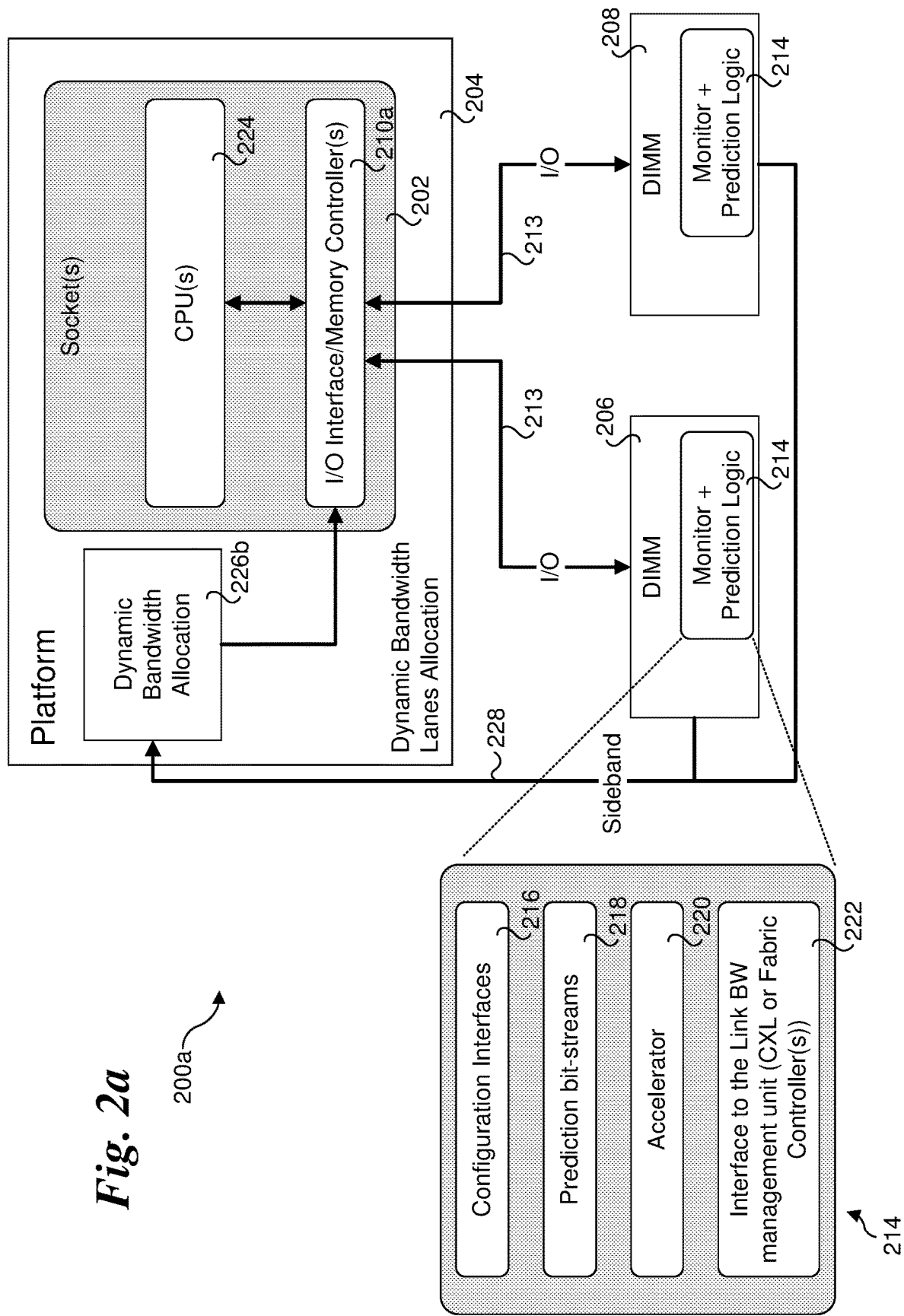
FIG. 2a is a schematic diagram illustrating a variant of the architecture of FIG. 2 implemented using an input/output (I/O) interconnect with a sideband feedback channel, according to one embodiment.

Under an optional approach, the feedback information is sent back via a sideband or out-of-band (OOB) channel, such as depicted by a sideband channel 228 in architecture 200*a* of FIG. 2*a* that provides feedback from DIMMs 206 and 208 to a dynamic bandwidth allocation block 226*a*. Under this configuration, an existing or future input/output (I/O) link technology other than CXL is used, as depicted by I/O interface/memory controller(s) 210*a* and I/O links 213.

Figure 2B:
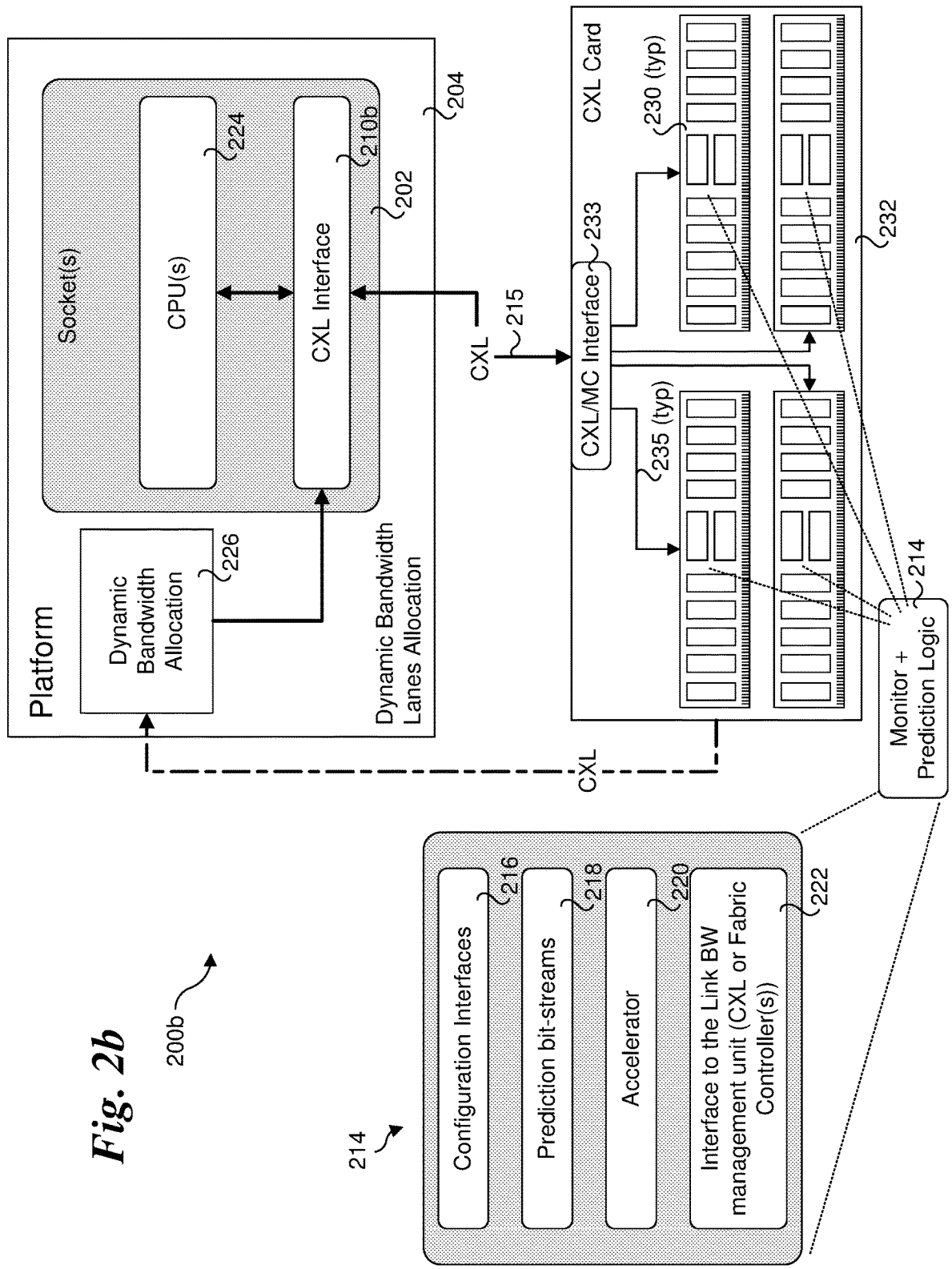
FIG. 2b is a schematic diagram illustrating a variant of the architecture of FIG. 2 implementing a CXL flex bus connected to a CXL card in which one or more DIMMs configured with monitor+prediction logic is installed.

Under architecture 200*b* of FIG. 2*b*, one or more DIMMs 230 are installed in a CXL card 232 connected to a CXL interface 210*b* via a CXL flex bus 215 and a CXL/MC interface 233. CXL cards share the same electricals and form factor as PCIe cards but use a CXL protocol rather than a PCIe protocol for communication. Under architecture 200*b*, each of DIMMs 230 includes monitor+prediction logic 214 that is configured in a similar manner to that described above. Under this configuration, dynamic bandwidth allocation block 226 receives feedback from each of DIMMs 230 to determine how to dynamically configure the lanes for CXL flex bus 215. Under one embodiment one of more of memory channels 235 comprises an interconnect segment (link) with configurable lanes.

Figure 2C:
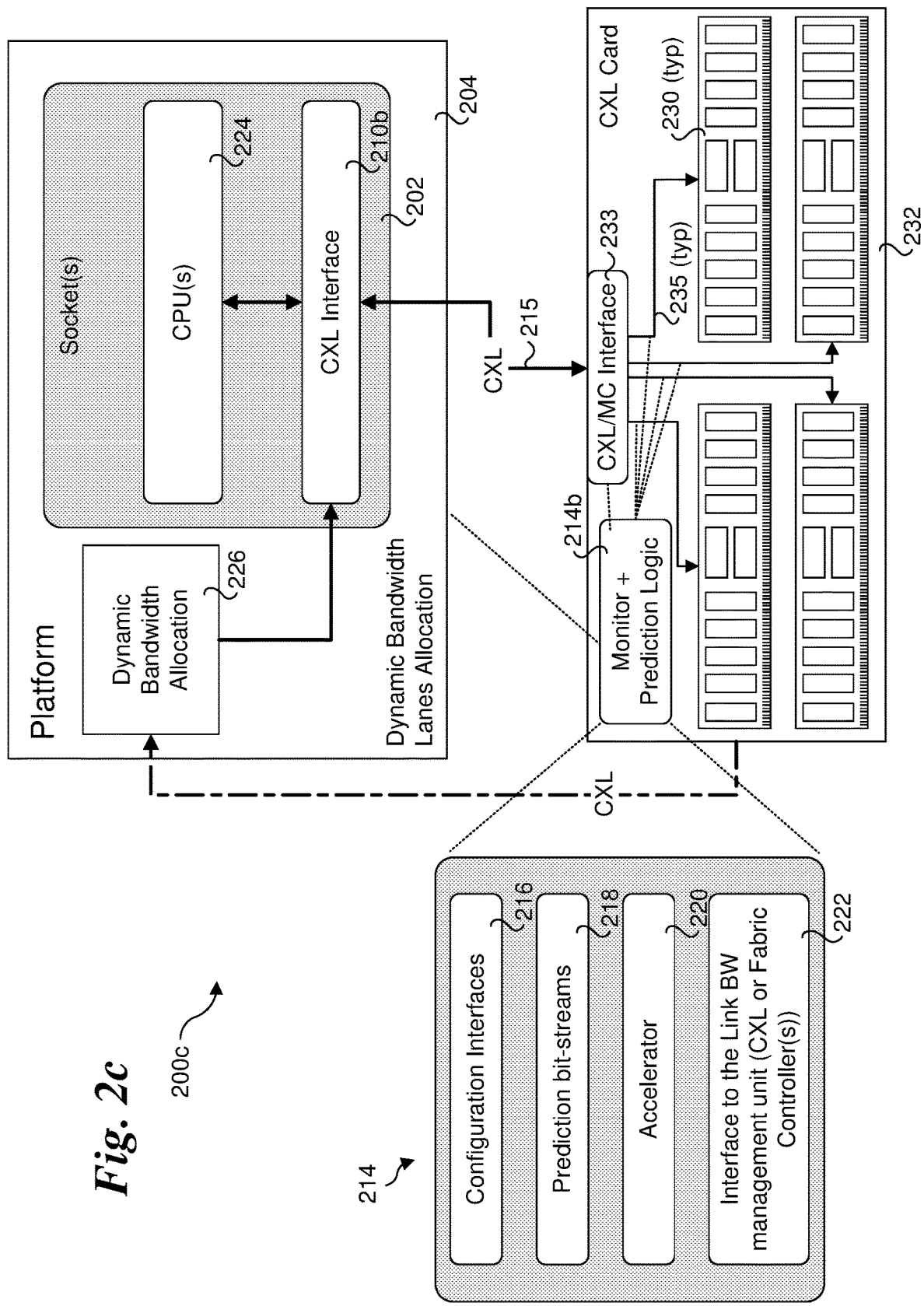
FIG. 2c is a schematic diagram illustrating a variant of the architecture of FIG. 2b under which monitor+prediction logic is implemented on the CXL card.

An optional approach is shown architecture 200c in FIG. 2c, under which monitor+predication logic 214b is implemented on CXL card 232 rather than on individual DIMMs 230. The dynamic bandwidth and lane allocation performed by dynamic bandwidth allocation block may configure CXL flex bus 215 using aggregated traffic monitoring for the one or more DIMMs 230 by observing traffic patterns for CXL flex bus 215. In one embodiment, monitor+prediction logic 214b is implemented in CXL/MC interface 233. In one embodiment, when monitor+prediction logic 214b is implemented in CXL/MC interface 233 it is configured to monitor traffic sent over CXL flex bus 215 and monitor traffic sent to one or more of DIMMs 230 over memory channels 235.

Generally, dynamic bandwidth allocation block 226 of FIGS. 2, 2b, and 2c may be implemented in software or in hardware. Examples of hardware implementations include a dynamic bandwidth allocation block 226 implemented on a SoC (System on a Chip) associated with a socket 202 (see, e.g., FIG. 9 below) or a separate discrete chip coupled to socket 202 via an I/O interconnect or the like. Dynamic bandwidth allocation block 226a of FIG. 2a may likewise be implemented on an SoC or as a separate discrete chip.

For embodiments that include a management channel or the like through use of management messages sent over the same interconnect structure that includes configurable lanes, interconnect segments (e.g., CXL flex buses or other types of link between a pair of interfaces) may be configured by propagating the management messages to the appropriate interfaces using a protocol supported by the interconnect. Additionally, in some embodiments there may be multiple interconnect segments coupled between a host platform/node and a memory device (e.g., DIMM, NVDIMM, etc.). Depending on the implementation, one or more of these interconnect segments may have configurable lanes, noting that not all the interconnect segments have to support configurable lanes. For example, in the embodiments of FIGS. 2b and 2c memory channels 235 may or may not employ configurable lanes.

In addition to supporting dynamic lane configuration of connections to local memory, embodiments may be implemented supporting dynamic lane configuration of connections to remote memory in a fabric or network. An example of this is illustrated by architecture 300 of FIG. 3 which includes a platform 302 including one or more sockets 304 and having a network/fabric interface 306 connected to a fabric interface 311 on a memory node 312 via a fabric switch 314 and fabric links 315 and 316. In turn, fabric interface 311 is connected to each DIMMs 308 and 310 via memory channels 317. Each of DIMMs 308 and 310 include monitor+prediction logic 318, which comprises configuration interfaces 320, prediction bit-streams 322, accelerator 324, and an interface to the link bandwidth (BW) management unit 326. Each socket 304 also includes one or more CPUs 328 connected to network/fabric interface 306.

Under the remote memory scheme of architecture 300, monitor+prediction logic 318 provides feedback to a dynamic bandwidth allocation control unit 330. In response to the feedback, dynamic bandwidth allocation control unit 330 provides control inputs to each of fabric switch 314 and Network/Fabric interface 306 to dynamically configure the lane configuration in each direction along a path between Network/Fabric interface 306 and DIMMs 308 and 310 traversing fabric switch 314. Generally, dynamic bandwidth allocation control unit 330 may be implemented in a data center entity (such as a POD manager as described and illustrated below) that controls how much bandwidth is allocated to a particular VLAN connecting the remote platform and the client platform (this presumes that there is an end-to-end capability to allocated bandwidth per direction).

Figure 3:
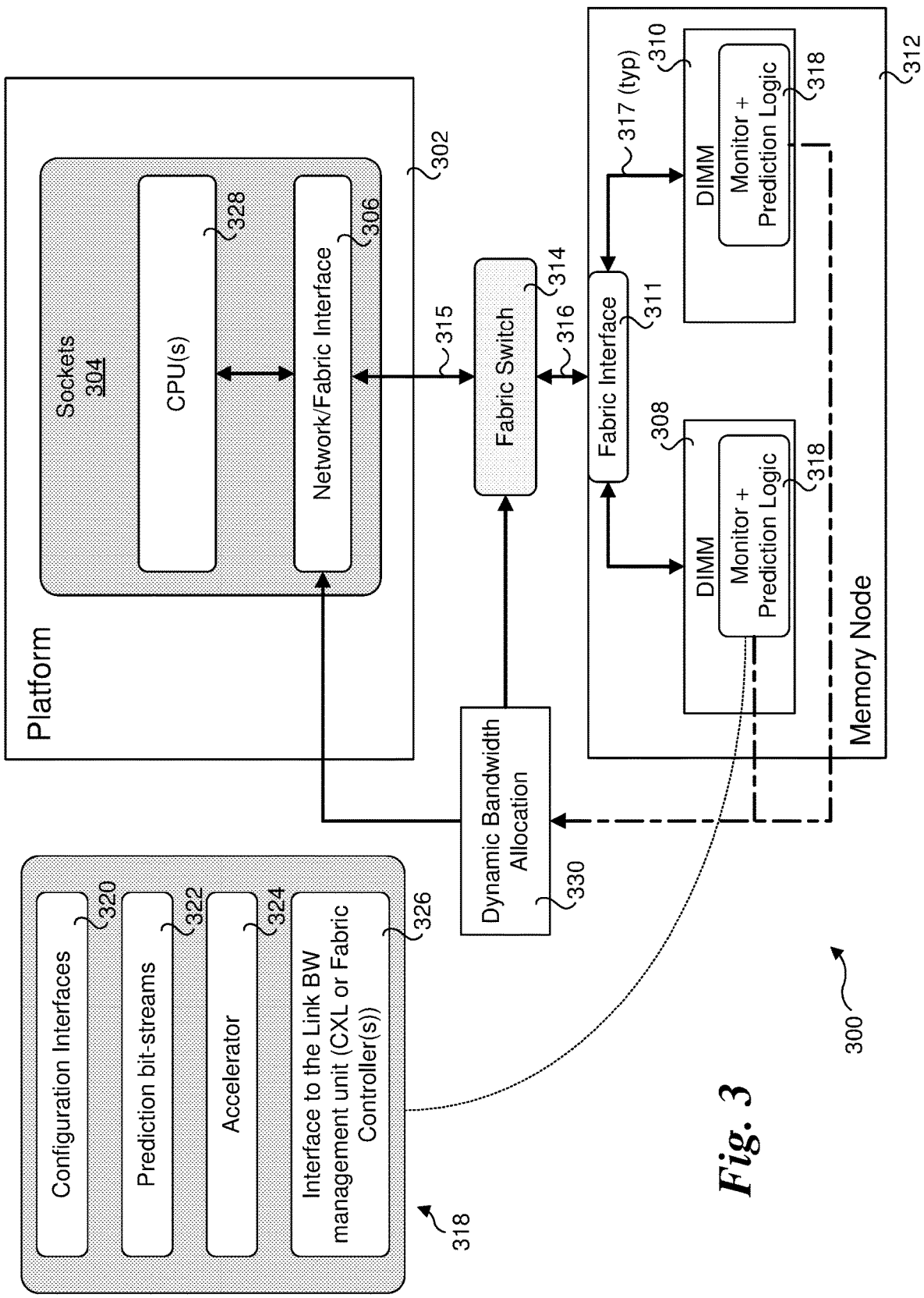
FIG. 3 is a schematic diagram illustrating an architecture supporting dynamic lane configuration using hardware-based telemetry and feedback for a remote memory installed in a memory node accessed via a fabric, according to one embodiment.
Figure 3A:
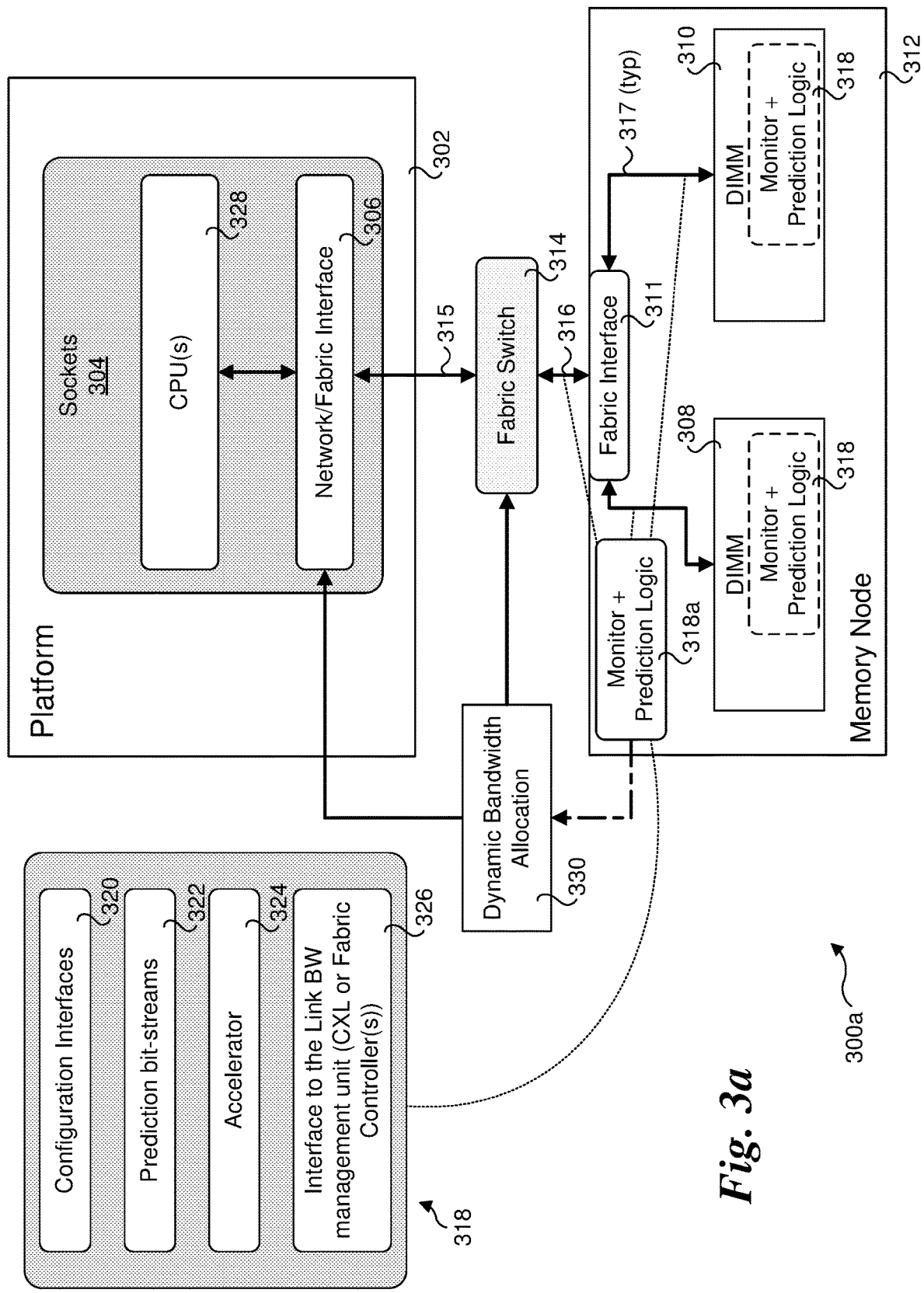
FIG. 3a is a schematic diagram illustrating a variant of the architecture of FIG. 3 under which monitor+prediction logic is implemented in the memory node.

FIG. 3a shows an architecture 300a that is a variant of architecture 300 further including monitor+prediction logic 318 implemented in fabric interface 311 (or coupled to fabric interface 311). In one embodiment, monitor+prediction logic 318a is configured to monitor the traffic on fabric link 316. In one embodiment one or more of memory channels between fabric interface 311 and DIMMs 308 and 310 is reconfigurable. Under alternative approaches, when a reconfigurable memory channel is implemented, monitor+prediction logic may be implemented either in the memory node or in the DIMM. When implemented in the memory node, the monitor+prediction logic is configured to monitor the traffic over the memory channels connecting the fabric interface to the DIMMs, such as memory channels 317 in architecture 300a.

Under alternate embodiments, a DIMM or a component in which the DIMM is installed is extended with the following elements.

a) Monitoring logic configured to collect over time read and write bandwidth (and potentially other metrics) to be used by the prediction algorithm(s). This logic may apply some data filtering algorithms, such as principal component analysis, to decide what data needs to be provided to the prediction logic. In one embodiment, the logic sends groups of historical data points to the prediction logic every N units of time (configurable).

b) Prediction logic that is configured to process the historical data provided by the monitoring logic using one or more algorithms (that can be configurable and inside an accelerator) in order to predict the expected read and write bandwidth for the following M units of time. In one embodiment, the logic sends this data every M units of time to the link management logic.

The embodiments disclosed herein may be implemented in various types of environments, including but not limited to data centers and/or cloud computing environments. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Figure 4:
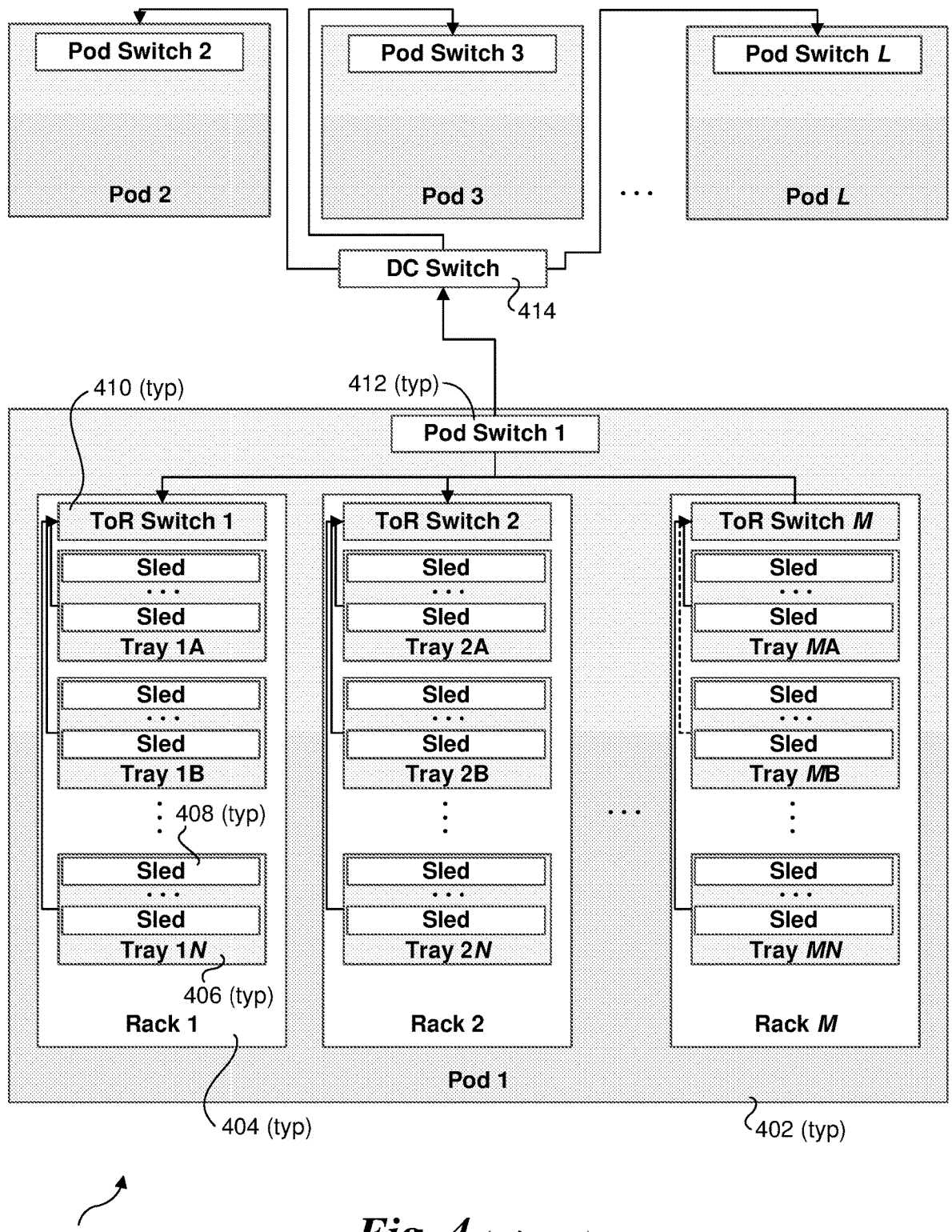
FIG. 4 is a schematic diagram of a conventional physical rack configuration in a data center.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 4 shows a portion of an exemplary physical hierarchy in a data center 400 including a number L of pods 402, a number M of racks 404, each of which includes slots for a number N of trays 406. Each tray 406, in turn, may include multiple sleds 408. For convenience of explanation, each of pods 402, racks 404, and trays 406 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 404 is a respective top of rack (ToR) switch 410, which is also labeled by ToR Switch number. Generally, ToR switches 410 are representative of both ToR switches and any other switching facilities that support switching between racks 404. It is conventional practice to refer to these switches as ToR switches whether or not they are physically located at the top of a rack (although they generally are).

Each Pod 402 further includes a pod switch 412 to which the pod's ToR switches 410 are coupled. In turn, pod switches 412 are coupled to a data center (DC) switch 414. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 5:
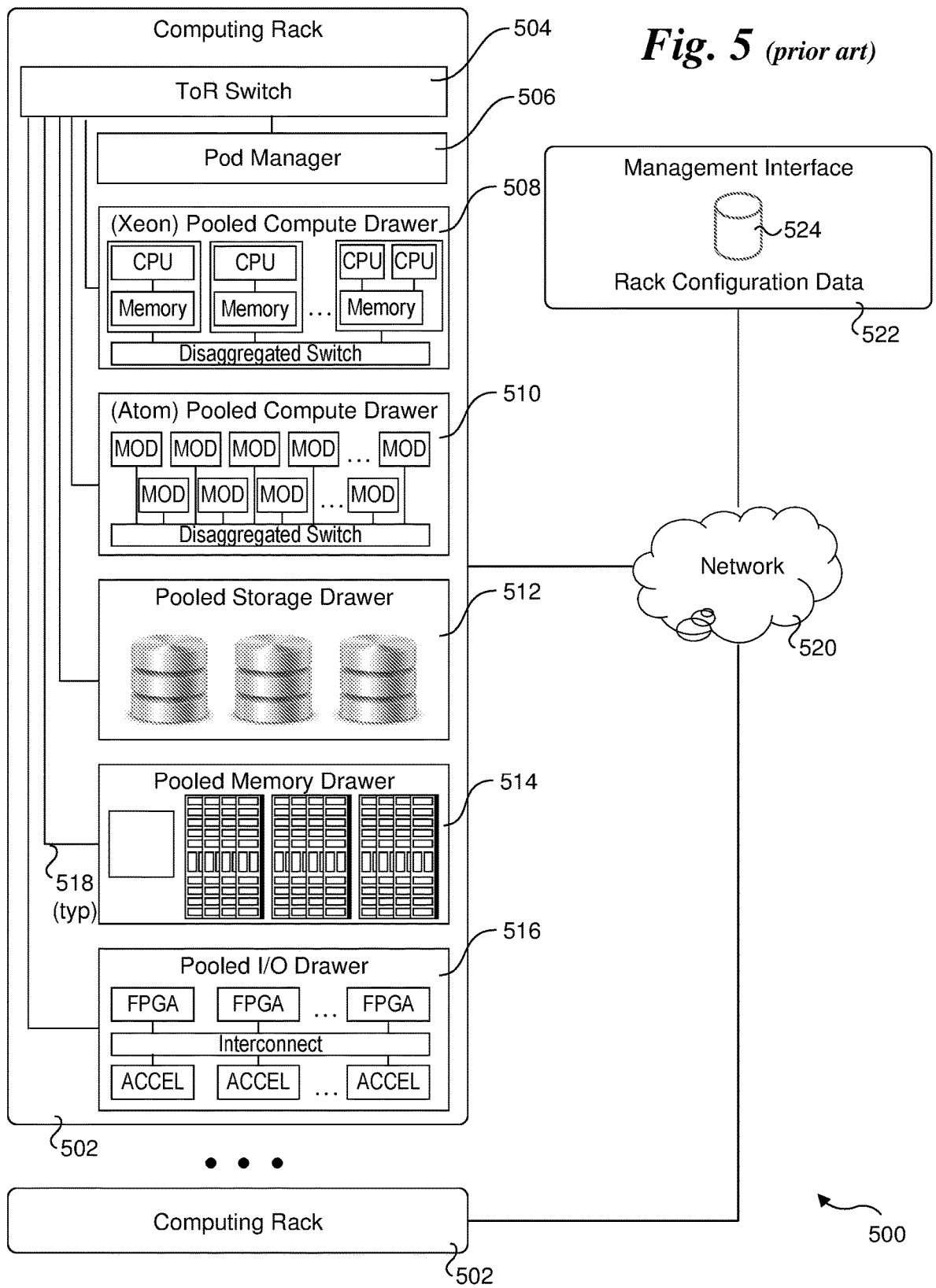
FIG. 5 is a schematic diagram of a Rack Scale Design (RSD) configuration in a data center, according to one embodiment.
Figure 6:
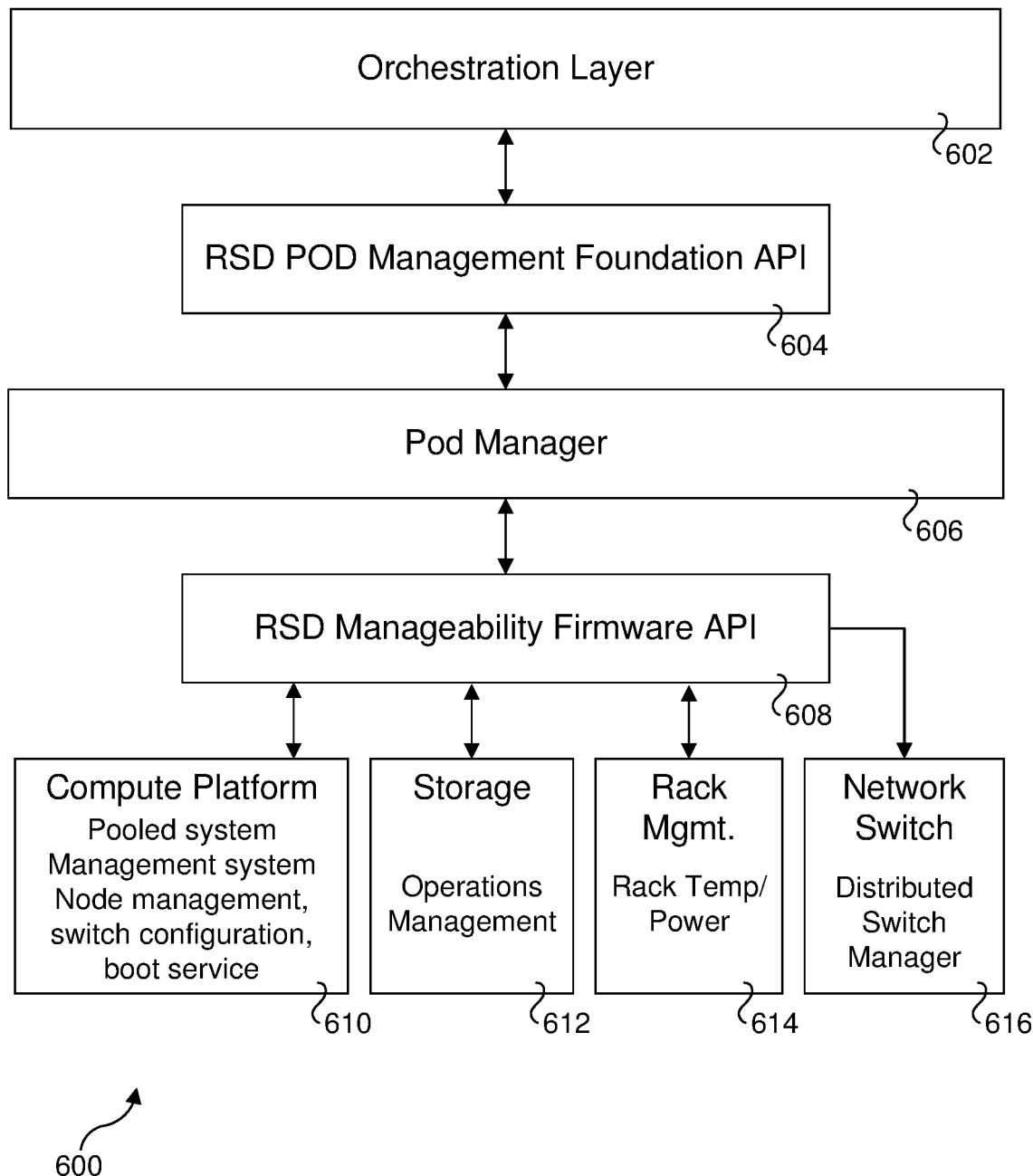
FIG. 6 is a block diagram of an RSD management architecture, according to one embodiment

An exemplary RSD environment 500 is illustrated in FIG. 5. RSD environment 500 includes multiple computing racks 502, each including a Top of Rack (ToR) switch 504, a pod manager 506, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 508, and INTEL® ATOM® pooled compute drawer 510, a pooled storage drawer 512, a pooled memory drawer 514, and a pooled I/O drawer 516. Each of the pooled system drawers is connected to ToR switch 504 via a high-speed link 518, such as a 40 Gigabit/second (Gb/s) or 100 Gb/s Ethernet link or a 100+Gb/s Silicon Photonics (SiPh) optical link. In one embodiment high-speed link 518 comprises an 800 Gb/s SiPh optical link.

Multiple of the computing racks 502 may be interconnected via their ToR switches 504 (e.g., to a pod-level switch or data center switch), as illustrated by connections to a network 520. In some embodiments, groups of computing racks 502 are managed as separate pods via pod manager(s) 506. In one embodiment, a single pod manager is used to manage all of the racks in the pod. Alternatively, distributed pod managers may be used for pod management operations.

RSD environment 500 further includes a management interface 522 that is used to manage various aspects of the RSD environment. This includes managing rack configuration, with corresponding parameters stored as rack configuration data 524.

FIG. 3 shows one embodiment of an RSD management architecture 600. The RSD management architecture includes multiple software and firmware components configured in a layered architecture including an orchestration layer 602, an RSD pod management foundation API 604 (Application Program Interface), a pod manager 606, and an RSD manageability firmware API 608. The bottom layer of RSD management architecture includes a compute platform management component 610, a storage management component 612, a rack management component 614, and a network switch management component 616.

The compute platform management component 610 performs operations associated with compute drawers and includes a pooled system, a management system, node management, switch configuration, and boot service. Storage management component 612 is configured to support operation management of pooled storage drawers. Rack management component 614 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 5. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 7 and discussed below.

Figure 7:
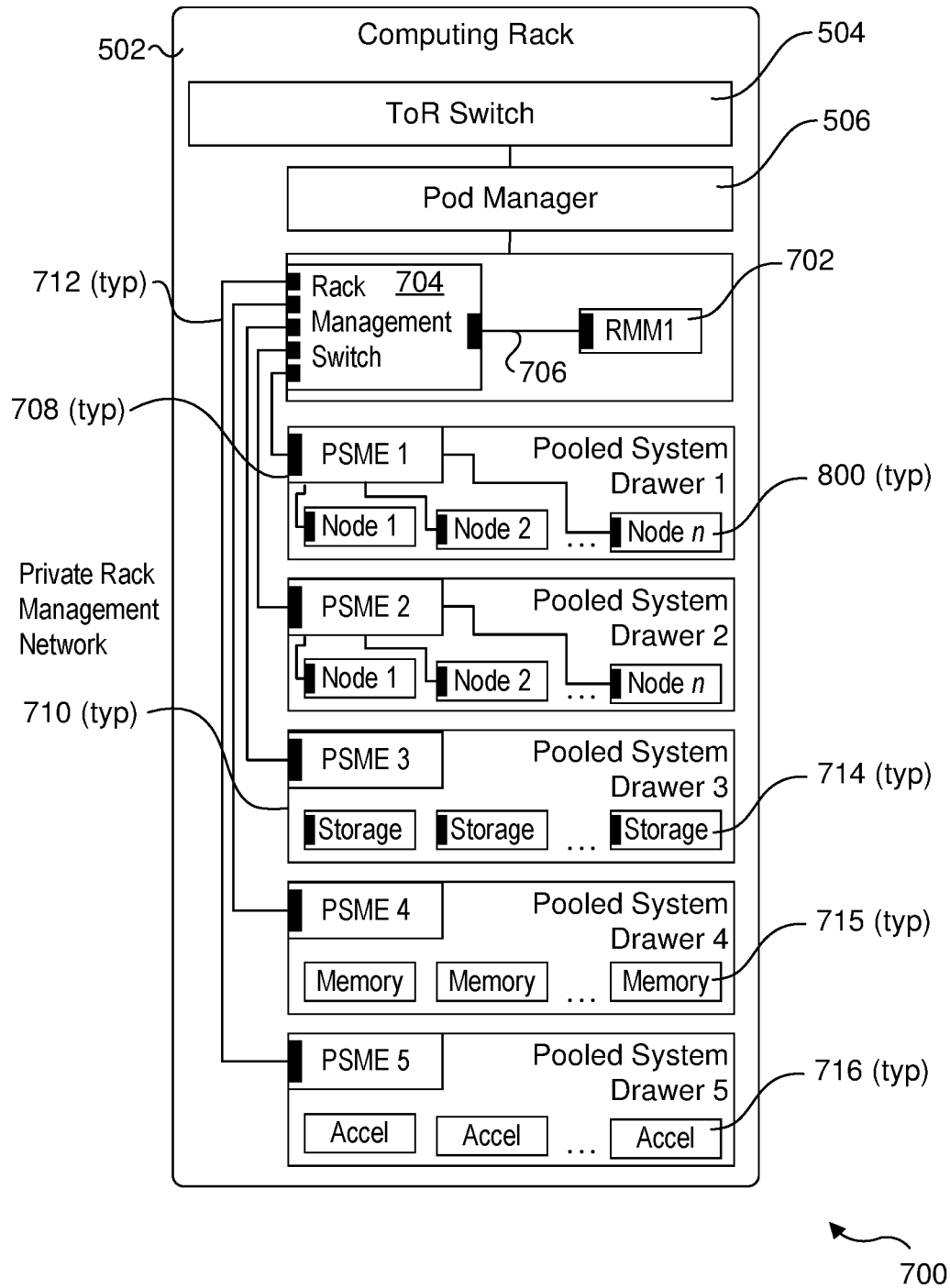
FIG. 7 is a schematic diagram showing further details of an RSD rack implementing Pooled System Management Engines (PSMEs)

FIG. 7 shows one embodiment of a rack configuration 700 employing rack management and configuration components that communicate over a private rack management network. The rack management and configuration components include an RMM 702 coupled in communication with a rack management switch 704 via a link 706. A respective PSME 708 is associated with each of five pooled system drawers 710. Each PSME 708 is connected to rack management switch 704 via a link 712. The rack management switch is also connected to POD Manager 506. In the illustrated embodiment, each of pooled system drawers 1 and 2 includes a plurality of compute nodes 800, while pooled system drawers 3, 4, and 5 respectively include a plurality of storage resources 714, a plurality of memory resources 715, and a plurality of IO accelerator resources 716.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Current enterprise/cloud computer systems have volatile memory, for example DRAM (Dynamic Random Access Memory) memory, and storage class non-volatile memory such as 3D crosspoint (3D XPOINT™) technology DIMMs (also called NVDIMMs), which are populated locally within the compute node. Other types of memory may also be used.

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of RAM, such as DRAM or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of storage devices that implement such standards may be referred to as DDR-based interfaces.

Figure 8:
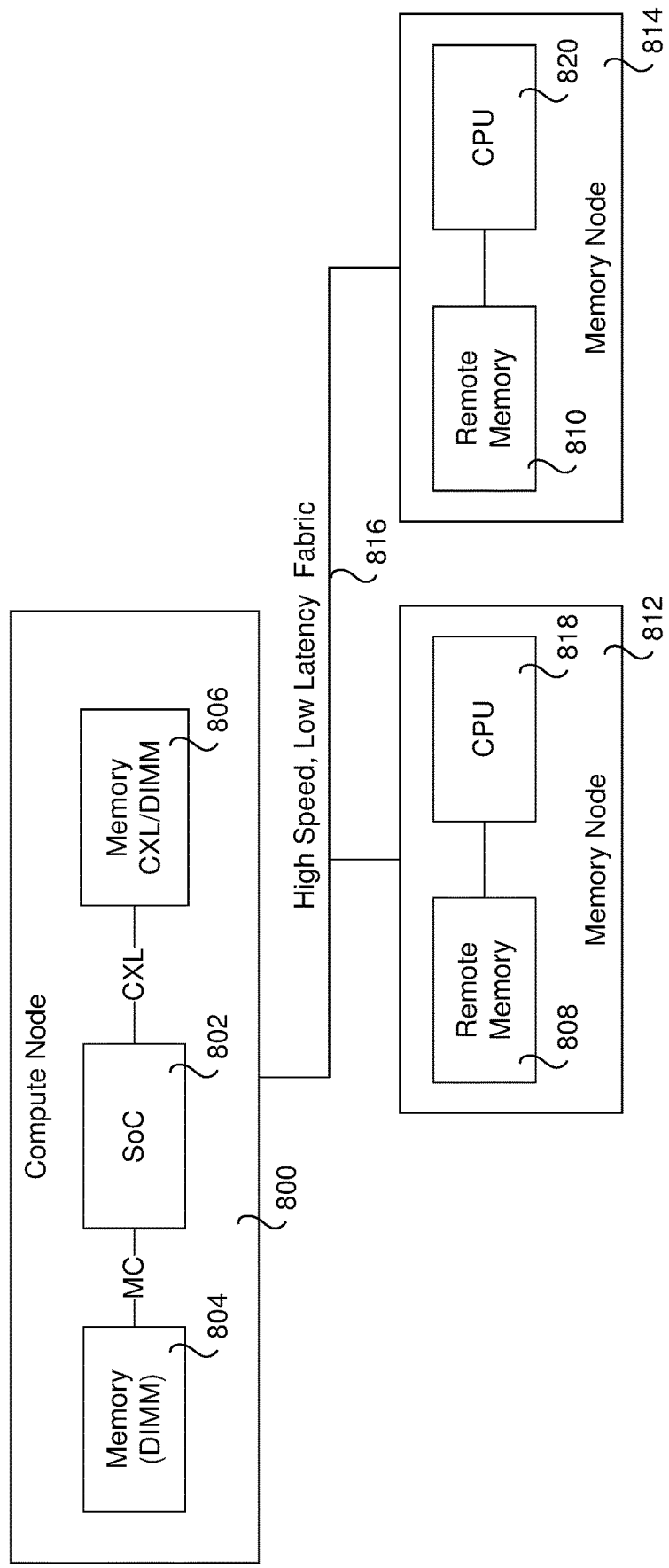
FIG. 8 is a schematic diagram illustrating an overview of a system including local memory accessed using a memory channel and a CXL flex bus and remote memory in a memory node accessed over a fiber, according to one embodiment.

As discussed above and illustrated in FIGS. 2, 2a, and 3, dynamic lane reconfiguration of interconnects to memory resources may be implemented for both local memory and remote memory resources in a manner that is transparent to application software running on a compute node. In abstract overview of this concept is shown in FIG. 8. A compute node 800 is shown including a processor/System on a Chip (SoC) 802 coupled a first local memory DIMM 804 via a memory channel (MC) and to a second local memory DIMM 806 via a CXL interconnect or flexbus. Compute node 800 is further shown connected to remote memory 810 and 812 in memory nodes 812 and 814, which are coupled to compute node 800 via a high-speed, low latency fabric 816. In the illustrated embodiment, remote memory 808 is coupled to a CPU 818 in memory node 812 and remote memory 810 is coupled to a CPU 820 in memory node 814. In one embodiment, memory nodes 812 and 814 employ storage-class memory (SCM) and are SCM nodes.

In addition to SCM, the memory nodes herein may employ various other types of memory, including both symmetric and asymmetric memory, as well as combinations of different types of memory. For example, a memory node may be part DRAM and part DCPMM and/or part other memory material, with caching and/or non-caching configurations. For instance, some of the DRAM may cache some of the DCPMM, and the remainder of DRAM and DCPMM exposed as flat tiers, etc. More than one interconnect path to the same module may also be used, such as a slow path connected via one type of interconnect and a fast path connected via a second type of interconnect.

Figure 9:
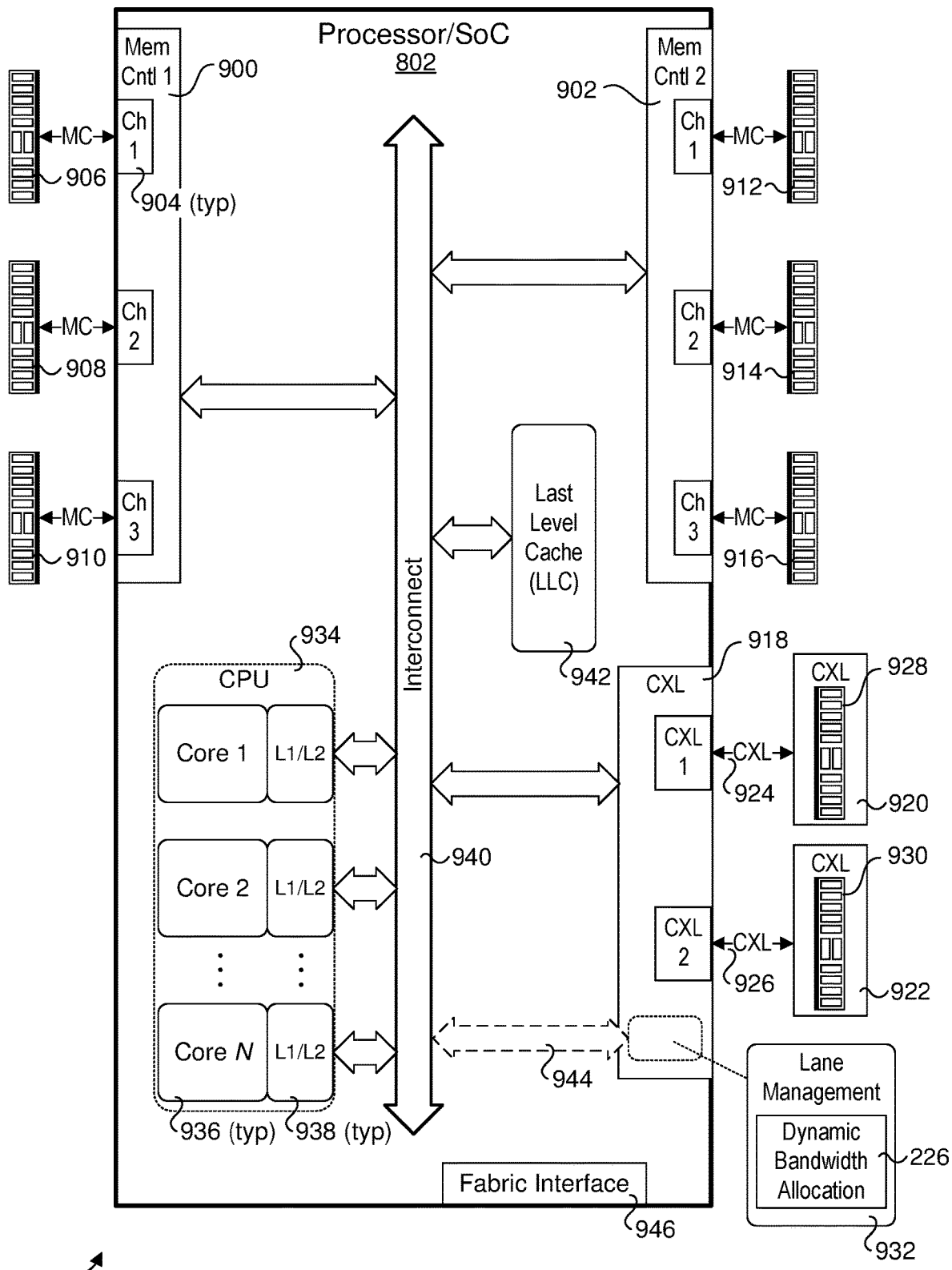
FIG. 9 is a schematic diagram illustrating one embodiment of a compute node including multiple memory channels and multiple CXL interfaces coupled to local memory devices.

FIG. 9 show further details of one embodiment of compute node 800. Processor/SOC 802 includes a pair of memory controller 900 and 902, each including three memory channels 904 (also labeled Ch(annel) 1, Ch 2, and Ch 3). Each of the memory channels 904 is coupled to a respective DIMM via a respective memory channel link (MC), including DIMMs 906, 908, 910, 912, 914, and 916). In practice, a given memory channel may be connected to one or more DIMMs, with a single DIMM being shown here for illustrative purposes and simplicity.

Compute node 800 also includes a CxL block 918 having two CXL interfaces (CXL 1, CXL 2) connected to respective CXL devices 920 and 922 via respective CXL interconnects or flex buses 924 and 926. Respective DIMMs 928 and 930 are installed in CXL devices 920 and 922, with each DIMM being operated as a host managed device memory under the Computer Express Link specification version 1.1 (June 2019). As defined in this specification, host managed device memory may be implemented as a Type 3—Memory Expander or as a Type 2 Device—Device with Memory. The CXL devices 920 and 922 include a CXL interface to communicate over a CXL flex bus and a DIMM interface to communicate with the DIMM. Under an alternative configuration, DIMMs 928 and 930 may comprise CXL DIMMs having a built-in CXL interface that performs similar functions to the CXL device functions under the Computer Express Link specification. In some embodiments, one or both of CXL devices 920 and 922 is a CXL card similar to CXL card 232 of FIG. 2b discussed above.

CxL block 918 also includes lane management logic 932, which is configured to implement dynamic bandwidth allocation block 226. In one embodiment, lane management logic 932 is configured to make bandwidth allocation and lane configuration determinations in response to feedback received over CXL flex buses 924 and 926, such as through use of CXL management messages. In another embodiment, lane management logic 932 may receive additional input from one or more processor cores via an optional interconnect 944. For simplicity, interconnect 944 is depicted as being connected to interconnect 940; in practice, processor/SoC 802 may include an interconnect hierarchy including two or more levels and interconnect 944 is connected to an interconnect at a level below interconnect 940 in the hierarchy.

Processor/SoC 802 further includes a CPU 934 comprising a plurality of processor cores 936, each with an associated Level 1 (L1) and Level 2 (L2) cache 938 and connected to a interconnect 940. A last level cache (LLC) 942 is also connected to interconnect 940, as are each of memory controllers 900 and 902, CxL block 918 and lane management logic 932. Collectively, the L1/L2 caches 938, interconnect 940, LLC 942, memory controller 902 and 904 and DIMMs 906, 908, 910, 912, 914, and 916 form a coherent memory domain. That coherent memory domain may be extended to memory connected to CXL devices via CXL flex buses under the Computer Express Link specification, such as DIMMs 928 and 930.

SoC 802 may include various I/O interfaces, such as a fabric interface 946. In some embodiments, an SoC may including multiple fabric interfaces or interfaces to different types of fabrics or networks, such as an Ethernet network interface in addition to fabric interface 946. Also, the fabric may be based on Ethernet, as well as non-Ethernet protocols and link structures.

Figure 10:
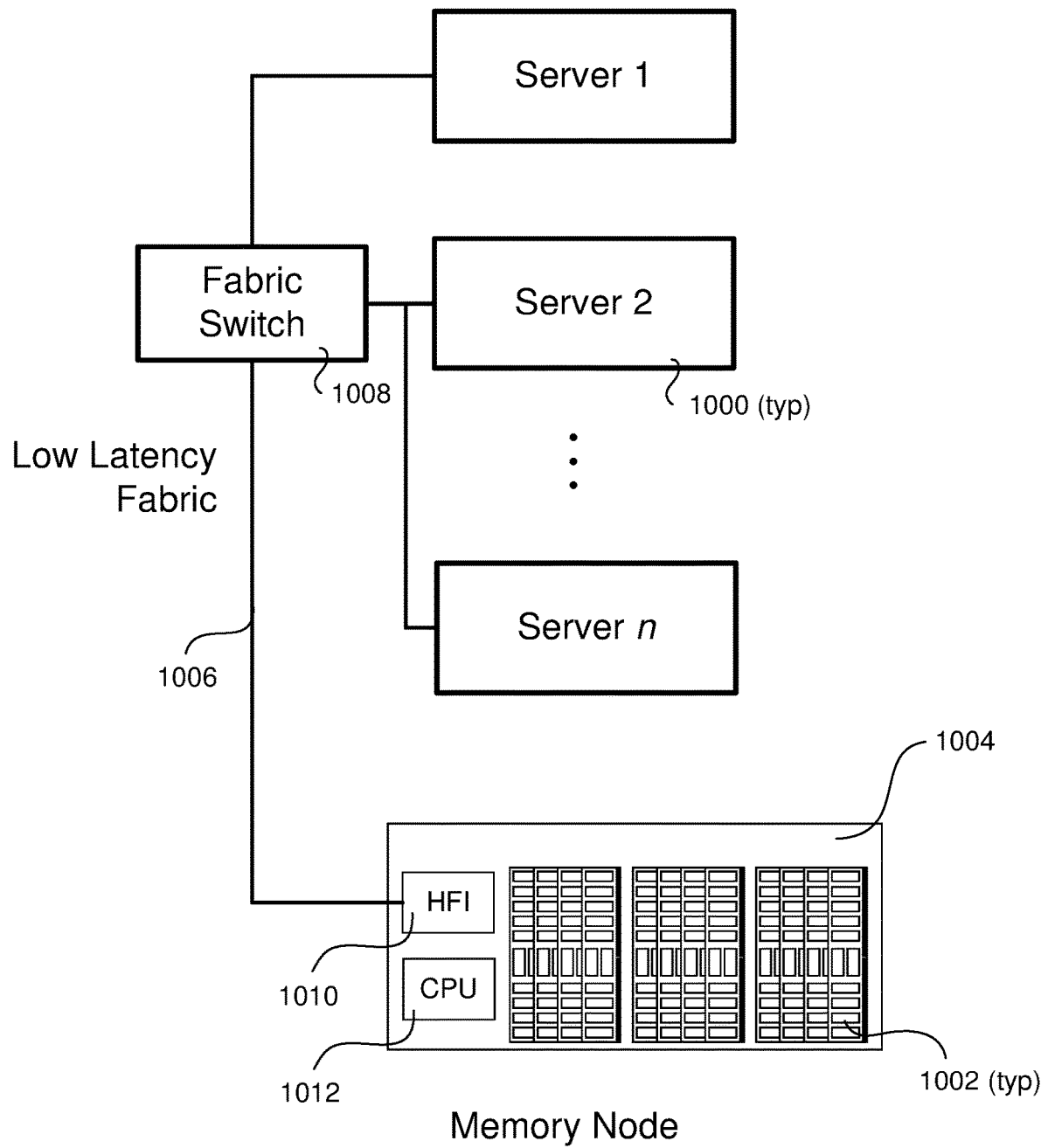
FIG. 10 is a schematic diagram illustrating an overview of a remote memory architecture under which remote memory is accessed over a low-latency fabric.

As discussed above, compute nodes and the like may be connected to memory resources in remote memory nodes. An overview of the concept is illustrated in FIG. 10. Under the mechanism, each of a plurality of compute nodes, such as servers 1000, is enabled to access memory 1002 in a memory node 1004 via a low latency fabric 1006 and a fabric switch 1008. In one embodiment, the low latency fabric comprises an INTEL® Omni-Path fabric, which employs the INTEL® Omni-Path Architecture (OPA). OPA employs a host fabric interface (HFI) at each fabric endpoint. Memory node 1004 is an example of an OPA endpoint and includes an HFI 1010. A processor 1012 is also used by memory node 1004 to facilitate access to memory 1002 via execution of instructions stored on the memory node, memory node 1004 contains storage class memory devices, such as 3D XPOINT™ technology DIMMs, which are used as disaggregated storage class memory. Other types of non-volatile memory devices may also be used, as well as volatile DRAM-based DIMMS, such as DDR4 (double data rate fourth generation) and future DDR5 (fifth generation) DIMMs or in combinations or other type of byte accessible memory DIMMs. Generally, an memory node may comprise a pooled system memory drawer, or multiple memory nodes may be installed in a pooled system memory drawer.

Figure 11:
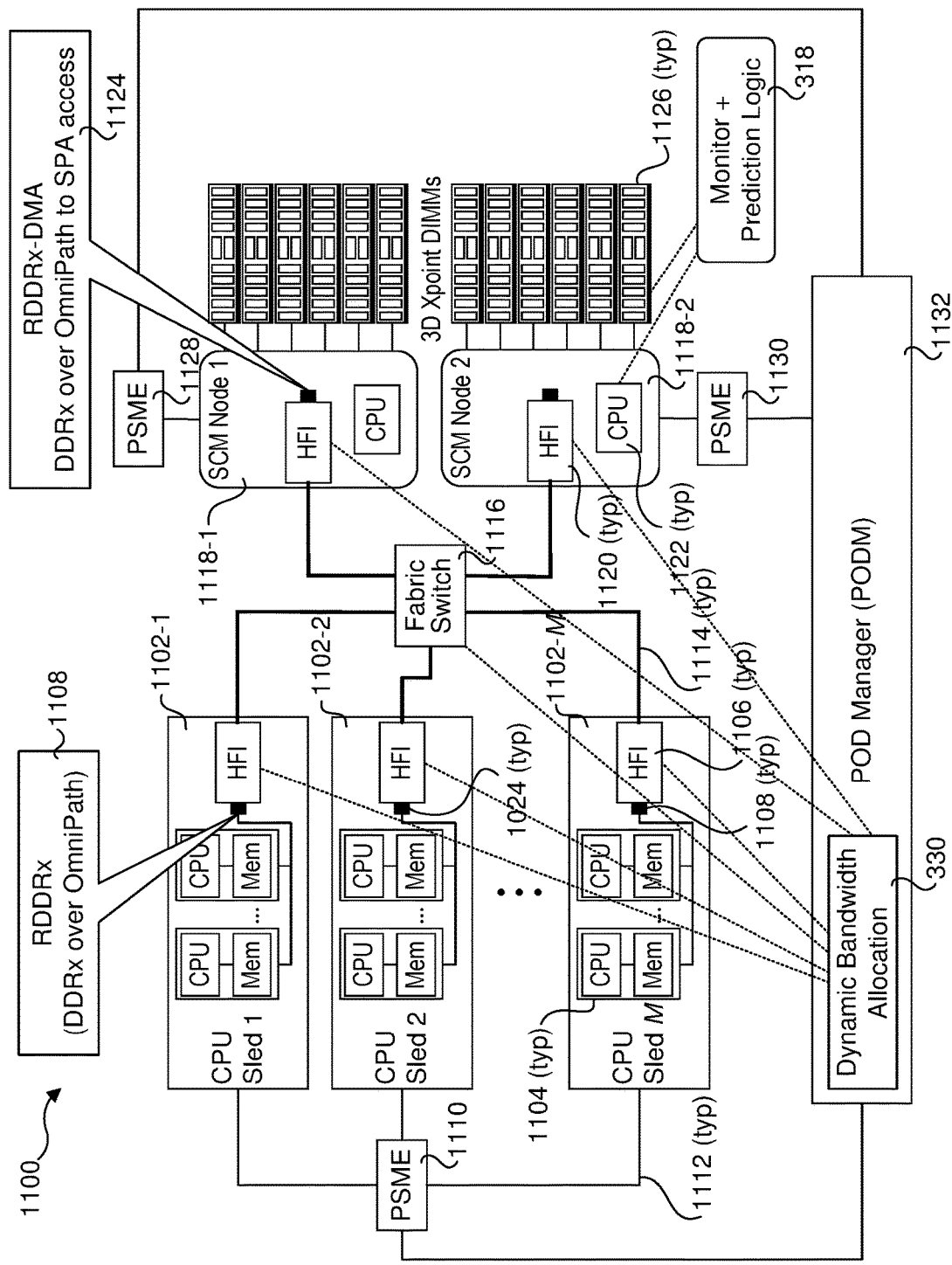
FIG. 11 is a schematic diagram illustrating one embodiment of an Storage Class Memory (SCM) architecture supporting access to remote memory employing a disaggregated memory architecture.

An exemplary disaggregated SCM memory architecture 1100 corresponding to one embodiment of an implementation under an RSD environment is shown in FIG. 11. SCM memory architecture 1100 includes a plurality of CPU sleds 1102-1-1102-M, also labeled Sled 1-Sled M. Each CPU sled 1102 includes one or more compute nodes 1104 including one or more CPUs and memory that is coupled to an HFI 1106 via a Remote DDR-based (referred to herein as RDDRx) engine 1108. As used herein, "DDRx" refers to any existing and future DDR-based memory interface and/or protocol defined by a current or future DDR standard or otherwise using DDR-based technology, whether standardized or not, including Joint Electron Device Engineering Council (JEDEC) DDR-based standards. Each CPU sled 1102 is connected to a PSME 1110 via a high-speed link 1112, such as a high-speed Ethernet link or SiPh optical link.

Each of HFIs 1106 is connected to an OPA fabric including a plurality of fabric links 1114 and a fabric switch 1116. The OPA fabric facilitates high-speed, low-latency communication between compute nodes 1104 and a pair of SCM nodes 1118-1 and 1118-2. Each of SCM nodes 1118-1 and 1118-2 includes an HFI 1120, a CPU 1122, and RDDRx-DMA (Direct Memory Access) engine 1124, and a plurality of 3D XPOINT™ technology DIMMs 1126 configured with monitor+prediction logic 318. Each of SCM nodes 1118-1 and 1118-2 is also connection to a respective PSME 1128 and 1130. Each of PSMEs 1110, 1128 and 1130 is connected to a POD Manager (PODM) 1132 including a dynamic bandwidth allocation block 330. In addition to using 3D XPOINT™ technology DIMMs 1126, other types of memory devices using various types of protocols may also be used, including DRAM-based devices, NVMe (Non-volatile Memory Express protocol) devices, or other type of byte accessible memory devices, or a combination of such memory devices.

CPU 1122 is representative of various types of processing elements, including processors, microcontrollers, etc., and the term "CPU" does not limit this component to a central processor unit. CPU 1122 is used for initializing memory using normal memory reference code. As a result, the SCM nodes shown herein could employ a microcontroller any other component capable of initializing the memory. In one embodiment, when monitor+prediction logic 318 is implemented in an SMC node one or more of its functions may be implemented via execution of firmware instructions on CPU 1122. Optionally, other forms of embedded logic may be used such as but not limited to application specific integrated circuits (ASICs) and field programmable gate arrays (FPGAs) or other fixed, programmable, or pre-programmed logic devices.

Under one embodiment, a POD manager is directly connected to SMC nodes via a management network or the like. As example of this is shown in FIG. 11a, wherein POD manager 1132 is connected to each of SCM nodes 1118-1 and 1118-2 and to each of CPU sleds 1102-1, 1102-2 . . . 1102-M via a switch 1133.

Figure 11A:
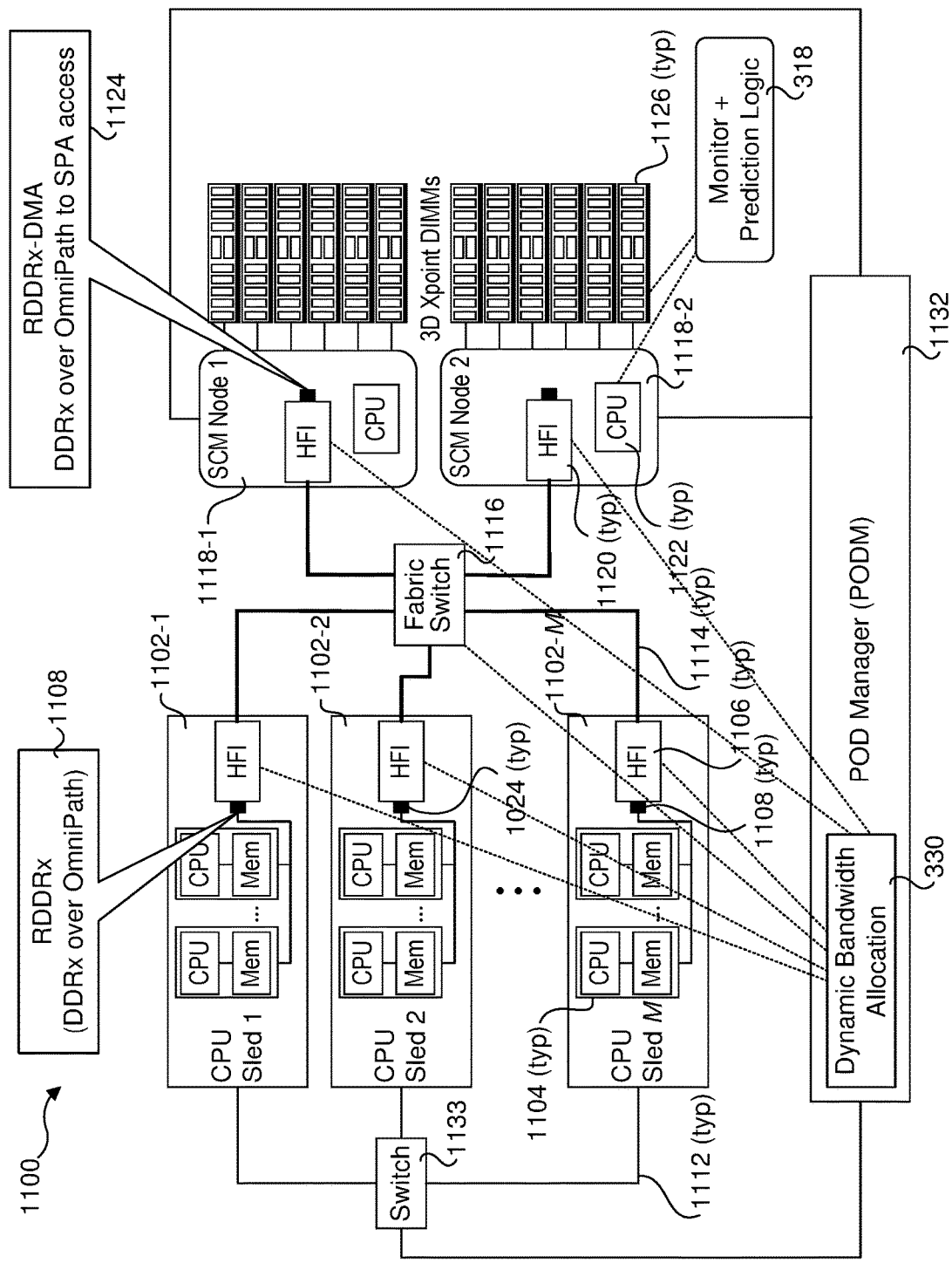
FIG. 11a is a schematic diagram illustrating a variant of the architecture of FIG. 11 in which a POD Manager is connected to SMC nodes via a management network.

As shown in FIGS. 11 and 11a, dynamic bandwidth allocation logic 330 is configured to dynamically involve fabric link configurations by sending lane configuration information via POD manager 1132 to each of HFIs 1106 and 1120 and fabric switch 1116. In some embodiments, monitor+prediction logic 318 may also be used to configure memory channels to 3D Xpoint DIMMs 1126 on SMC nodes 1118-1 and 1118-2.

Figure 12:
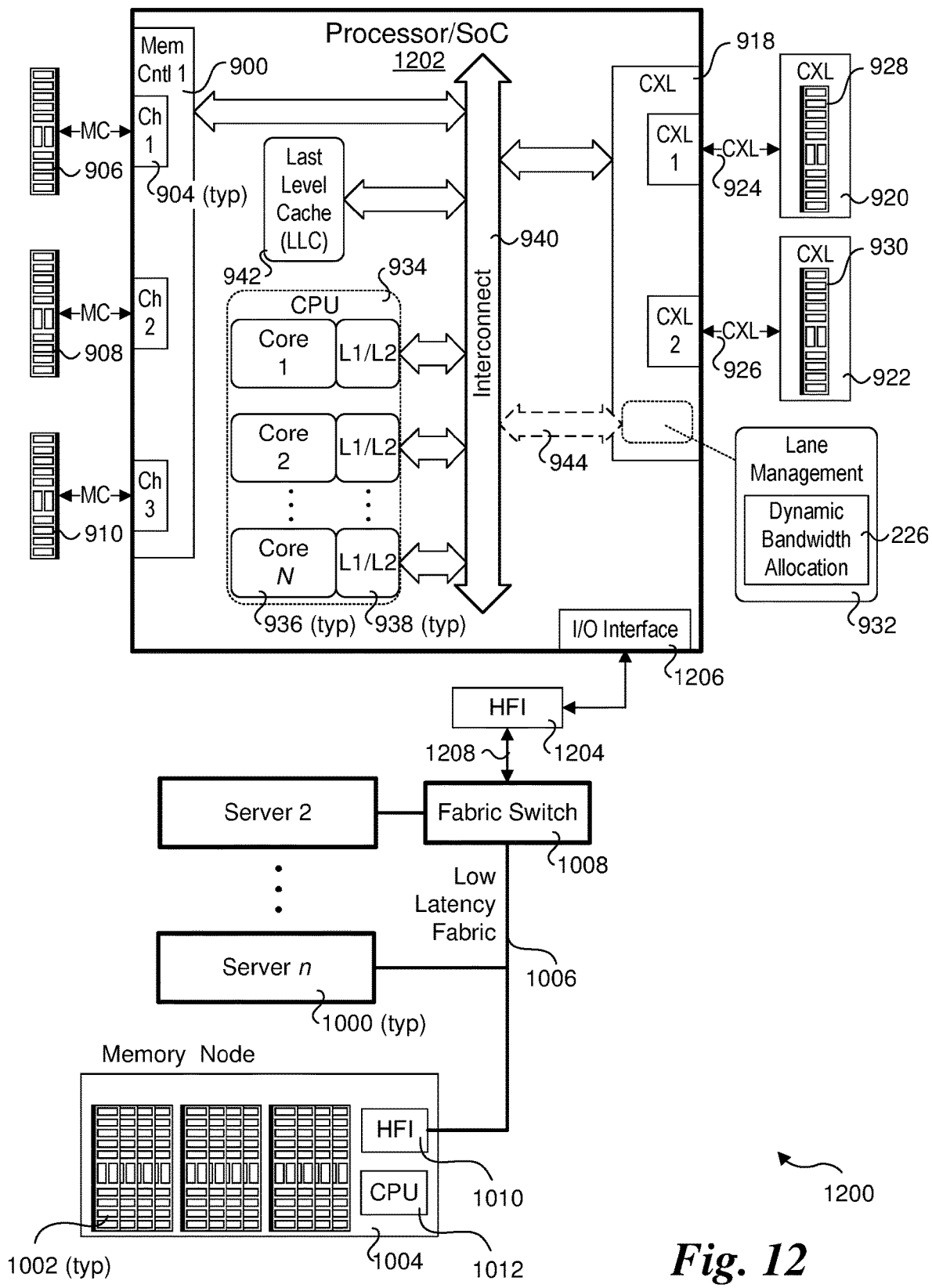
FIG. 12 is a schematic diagram illustrating a system architecture configured to support access to both local memory and remote memory using embodiments of the hardware-based telemetry and feedback mechanisms disclosed herein.

FIG. 12 shows a system architecture 1200 configured to support access to both local memory and remote memory using embodiments of the hardware-based telemetry and feedback mechanisms disclosed herein. System architecture 1200 includes a processor/SoC 1202 having a similar configuration to processor/SoC 802 of FIG. 9 as indicated by like-reference numbers. System architecture 1200 further depicts a configuration using an off-chip HFI 1204 coupled to an I/O interface 1206 on processor/SoC 1202. The remainder of the architecture below HFI 1204 is similar to that shown in FIG. 10, wherein like reference numbers in FIGS. 12 and 10 refer to similar components.

The dynamic bandwidth allocation and lane reconfiguration aspects of the embodiments described above provide advantages several advantages over current architecture employing fixed lane interconnects. The ability to dynamically (re)configure interconnect structures in view of predicted read/write traffic patterns improves bandwidth utilizations of the interconnects for both local memory and remote memory implementations, leading to increased throughput. In addition, lanes may be dynamically reconfigured in view of power considerations, enabling power to be reduced while maintaining sufficient read/write bandwidth.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'M', 'N', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
coupling a compute host to a memory device via an interconnect structure including one or more interconnect segments including an input/output (I/O) link comprising a Compute Express Link (CXL) flex bus or a memory channel with a plurality of reconfigurable upstream lanes and downstream lanes, the memory device including volatile memory comprising a majority of storage capacity for the memory device;
performing memory reads and writes initiated by the host to read data from the memory device and write data to the memory device via the interconnect structure;
at the memory device,
monitoring memory read and memory write traffic transferred via the I/O link;
predicting, based on the monitored memory read and memory write traffic, expected read and write bandwidths for the I/O link; and
dynamically reconfiguring the plurality of upstream lanes and downstream lanes for the I/O link based on expected memory read and write bandwidths for the I/O link.

2. The method of claim 1, wherein the memory device comprises a Dual In-line Memory Module (DIMM).

3. The method of claim 1, wherein the memory device comprises a Dual In-line Memory Module (DIMM) that is configured to perform the monitoring and predicting operations.

4. The method of claim 1, wherein the memory device is installed in a Compute Express Link (CXL) card that is coupled to the compute host via the CXL flex bus comprising the I/O link.

5. The method of claim 4, wherein the CXL card is configured to perform the monitoring and predicting operations.

6. The method of claim 1, further comprising:
sending expected read and write bandwidth usage data for the I/O link to a bandwidth management component; and
utilizing the bandwidth management component to dynamically reconfigure the plurality of upstream and downstream lanes for the I/O link based on the expected read and write bandwidth usage data.

7. An apparatus comprising:
a Compute Express Link (CXL) interface configured to be connected to a CXL bus via which a compute host is directly or indirectly connected, the CXL bus including a plurality of reconfigurable upstream lanes and downstream lanes;
one or more memory devices coupled to the CXL interface via an internal interconnect; and
logic configured to,
monitor memory read and memory write traffic transferred via the internal interconnect to and from the one or more memory devices; and
predict, based on the memory read and memory write traffic that is monitored, expected read and write bandwidths for the CXL bus.

8. The apparatus of claim 7, further comprising logic to send telemetry information comprising the expected read and write bandwidths predicted for the CXL bus to the compute host.

9. The apparatus of claim 7, further comprising logic to:
receive lane configuration information from the compute host; and
dynamically reconfigure the plurality of upstream lanes and downstream lanes for the CXL bus based on the lane configuration information received from the compute host.

10. The apparatus of claim 7, wherein the one or more memory devices comprise Dual In-line Memory Modules (DIMMs) coupled to the CXL interface via the internal interconnect.

11. The apparatus of claim 10, wherein each DIMM is connected to the CXL interface via a respective internal interconnect segment, and wherein each DIMM includes logic for monitoring read and write traffic transferred over its respective internal interconnect segment.

12. The apparatus of claim 10, wherein each DIMM is connected to the CXL interface via a respective internal interconnect segment, and wherein the logic is configured to for monitor read and write traffic transferred over the respective internal interconnect segment for each DIMM.

13. The apparatus of claim 7, wherein the CXL interface includes an integrated or co-located memory controller.

14. The apparatus of claim 7, wherein the apparatus comprises a CXL card.

15. The apparatus of claim 7, further comprising the CXL bus and the compute host.

16. A system comprising:
a processor having a System on a Chip (SoC) architecture comprising,
a plurality of processor cores coupled to an interconnect;
a Compute Exchange Link (CXL) interface, coupled to the interconnect; and
a CXL device coupled to the CXL interface via a CXL bus having a plurality of upstream lanes and downstream lanes,
wherein the system is configured to,
monitor memory read and memory write traffic transferred via the CXL bus;
predict, based on the monitored memory read and memory write traffic, expected read and write bandwidths for the CXL bus; and
dynamically reconfigure the plurality of upstream lanes and downstream lanes for the CXL bus based on the expected read and write bandwidths that are predicted.

17. The system of claim 16, wherein the CLX device comprises a CLX card with one or more Dual In-line Memory Modules (DIMMs) and the CLX card includes logic configured to implement the monitoring and predicting operations.

18. The system of claim 16, wherein the processor further includes a dynamic bandwidth allocation block; and wherein the system is further configured to:
send telemetry information comprising the expected read and write bandwidths for the CXL bus to the processor;
determine, using the dynamic bandwidth allocation block, a lane configuration to be used for the CXL bus; and
dynamically reconfigure the plurality of upstream lanes and downstream lanes for the CXL bus based on the lane configuration determined by the dynamic bandwidth allocation block.

19. The system of claim 18, further configured to:
send the telemetry information over the CXL bus to the processor;
return lane configuration information corresponding to the lane configuration determined by the dynamic bandwidth allocation block from the processor to the CXL device; and
process the lane configuration information at the CXL device to dynamically reconfigure the plurality of upstream lanes and downstream lanes for the CXL bus.

20. The method of claim 2, wherein the DIMM is a DDR5 (double date rate 5$^{th}$ generation) DRAM DIMM.

\* \* \* \* \*

UNITED STATES PATENT AND TRADEMARK OFFICE
CERTIFICATE OF CORRECTION

| | | |
|---|---|---|
| PATENT NO. | : 12,455,841 B2 | Page 1 of 1 |
| APPLICATION NO. | : 18/371513 | |
| DATED | : October 28, 2025 | |
| INVENTOR(S) | : Benjamin Graniello et al. | |

It is certified that error appears in the above-identified patent and that said Letters Patent is hereby corrected as shown below:

In the Specification

Column 10, Line 32, "C×L" should be changed to --CXL--

Column 10, Line 51, "C×L" should be changed to --CXL--

Column 11, Line 4, "C×L" should be changed to --CXL--

Signed and Sealed this
Twenty-third Day of December, 2025

John A. Squires
*Director of the United States Patent and Trademark Office*